United States Patent

Chakravarti et al.

[11] Patent Number: 6,146,603
[45] Date of Patent: Nov. 14, 2000

[54] SYSTEM FOR RECOVERING CARBON DIOXIDE FROM A LEAN FEED

[75] Inventors: Shrikar Chakravarti, Williamsville; Amitabh Gupta, East Amherst, both of N.Y.

[73] Assignee: Praxair Technology, Inc., Danbury, Conn.

[21] Appl. No.: 09/329,278

[22] Filed: Jun. 10, 1999

[51] Int. Cl.[7] .................................................. B01D 53/62
[52] U.S. Cl. ............................ 423/228; 423/229; 96/202; 96/234; 422/168
[58] Field of Search .................................. 423/228, 229; 422/168; 96/202, 234

[56] References Cited

U.S. PATENT DOCUMENTS

| | | | |
|---|---|---|---|
| 4,364,915 | 12/1982 | Proctor | 423/437 |
| 4,440,731 | 4/1984 | Pearce | 423/228 |
| 4,477,419 | 10/1984 | Pearce et al. | 423/228 |
| 4,624,839 | 11/1986 | Wolcott et al. | 423/228 |
| 4,869,884 | 9/1989 | Riggs | 423/229 |
| 5,061,465 | 10/1991 | Carter | 423/229 |

FOREIGN PATENT DOCUMENTS 588178  3/1994  European Pat. Off. .

*Primary Examiner*—Tom Dunn
*Assistant Examiner*—Peter DiMauro
*Attorney, Agent, or Firm*—Stanley Ktorides

[57] ABSTRACT

A system for recovering absorbate such as carbon dioxide using an alkanolamine absorbent fluid, wherein the loaded absorbent is heated in a two step heating procedure prior to the separation of the absorbate from the absorbent, and wherein the loaded absorbent is deoxygenated after the first heating step and prior to the second heating step.

10 Claims, 2 Drawing Sheets

SYSTEM FOR RECOVERING CARBON DIOXIDE FROM A LEAN FEED

TECHNICAL FIELD

This invention relates generally to the recovery of carbon dioxide using an alkanolamine absorbent.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses include drinking water treatment, an environmentally-friendly pesticide and an atmosphere additive in greenhouses to improve the growth of vegetables.

Generally carbon dioxide is produced by purifying a waste stream which is a by-product of an organic or inorganic chemical process. The waste stream, which comprises a high concentration of carbon dioxide, is condensed and purified in multiple steps and then distilled to produce the product grade carbon dioxide.

As the demand for carbon dioxide continues to increase, alternate sources of carbon dioxide are being used to supply the crude carbon dioxide feed to the purification system. Such alternate feeds have a much lower concentration of carbon dioxide and thus need to be upgraded, i.e. the concentration of the carbon dioxide must be increased, before product grade carbon dioxide can be effectively produced. These alternate feeds with much lower carbon dioxide concentrations will be referred to as lean feeds. An example of such a lean feed is flue gas that could come from a combustion source such as a boiler, internal combustion engine, gas turbine or lime kiln.

Upgrading of the carbon dioxide concentration in a feed can be carried out in a number of ways. One particularly preferred method is the chemical absorption of carbon dioxide from the crude carbon dioxide feed into an alkanolamine based absorbent. The resulting carbon dioxide loaded absorbent then undergoes separation into carbon dioxide product for recovery and into alkanolamine containing absorbent which is typically recycled for reuse within the recovery system.

Often the crude carbon dioxide feed contains significant levels of oxygen which can cause degradation of the alkanolamines reducing their utility in the recovery system and also causing corrosion problems in the system. Such oxygen could come from the feed itself and/or equipment leaks, or from makeup fluids. Those skilled in the art have addressed this problem in one of two ways. In one method, chemical inhibitors are added to the absorber fluid to protect against degradation by inhibiting the oxidation of the alkanolamines. In another method, a combustible fuel is added to the crude carbon dioxide feed for combustion with the oxygen in a catalytic combustion reaction. While both methods are effective they are both characterized by high capital costs and, moreover, are complicated to operate.

Accordingly, it is an object of this invention to provide a system which can more effectively recover carbon dioxide or other absorbate from an oxygen containing feed using an alkanolamine based absorbent to upgrade the feed.

SUMMARY OF THE INVENTION

The above and other objects, which will become apparent to one skilled in the art upon a reading of this disclosure, are attained by the present invention, one aspect of which is:

A method for recovering carbon dioxide from a lean feed comprising:

(A) providing a lean feed comprising oxygen and carbon dioxide in mass transfer contact with absorbent comprising at least one alkanolamine, and passing oxygen and carbon dioxide from the lean feed into the absorbent to obtain carbon dioxide loaded absorbent containing dissolved oxygen;

(B) heating the carbon dioxide loaded absorbent to obtain heated carbon dioxide loaded absorbent;

(C) removing at least some of the dissolved oxygen from the carbon dioxide loaded absorbent to obtain oxygen depleted carbon dioxide loaded absorbent; and (D) further heating the oxygen depleted carbon dioxide loaded absorbent and thereafter recovering carbon dioxide from the absorbent.

Another aspect of the invention is:

Apparatus for recovering absorbate from an oxygen-containing feed comprising.

(A) an absorption column, means for passing a feed comprising oxygen and absorbate into the lower portion of the absorption column, and means for passing absorbent comprising at least one alkanolamine into the upper portion of the absorption column;

(B) a first heat exchanger, an oxygen separator, means for passing fluid from the lower portion of the absorption column to the first heat exchanger, and means for passing fluid from the first heat exchanger to the oxygen separator;

(C) a second heat exchanger and means for passing fluid from the oxygen separator to the second heat exchanger; and (D) an absorbate recovery system, means for passing fluid from the second heat exchanger to the absorbate recovery system, and means for recovering absorbate from the absorbate recovery system.

As used herein, the term "absorption column" means a mass transfer device that enables a suitable solvent, i.e. absorbent, to selectively absorb the absorbate from a fluid containing one or more other components.

As used herein, the term "stripping device" means a mass transfer device, such as a column, wherein a component such as absorbate is separated from absorbent, generally through the application of energy.

As used herein, the term "lean feed" means a fluid having a carbon dioxide concentration less than 50 mole percent.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

As used herein, the term "inhibitor" means a chemical or mixture of chemicals that inhibits or reduces the rate of a reaction. For example, copper carbonate in combination with one or more of dihydroxyethylglycine, alkali metal permanganate, alkali metal thiocyanate, nickel or bismuth oxides with or without alkali metal carbonate inhibits oxidative degradation of an alkanolamine.

DETAILED DESCRIPTION

This invention comprises the discovery that when a carbon dioxide loaded alkanolamine based absorbent is partially heated, oxygen removal can proceed without incurring alkanolamine degradation or requiring inhibitors, and subsequent further heating can prepare the fluid for effective separation enabling effective and lower cost carbon dioxide recovery and also the production of high quality alkanolamine absorbent which can be recovered and reused.

Figure 1:
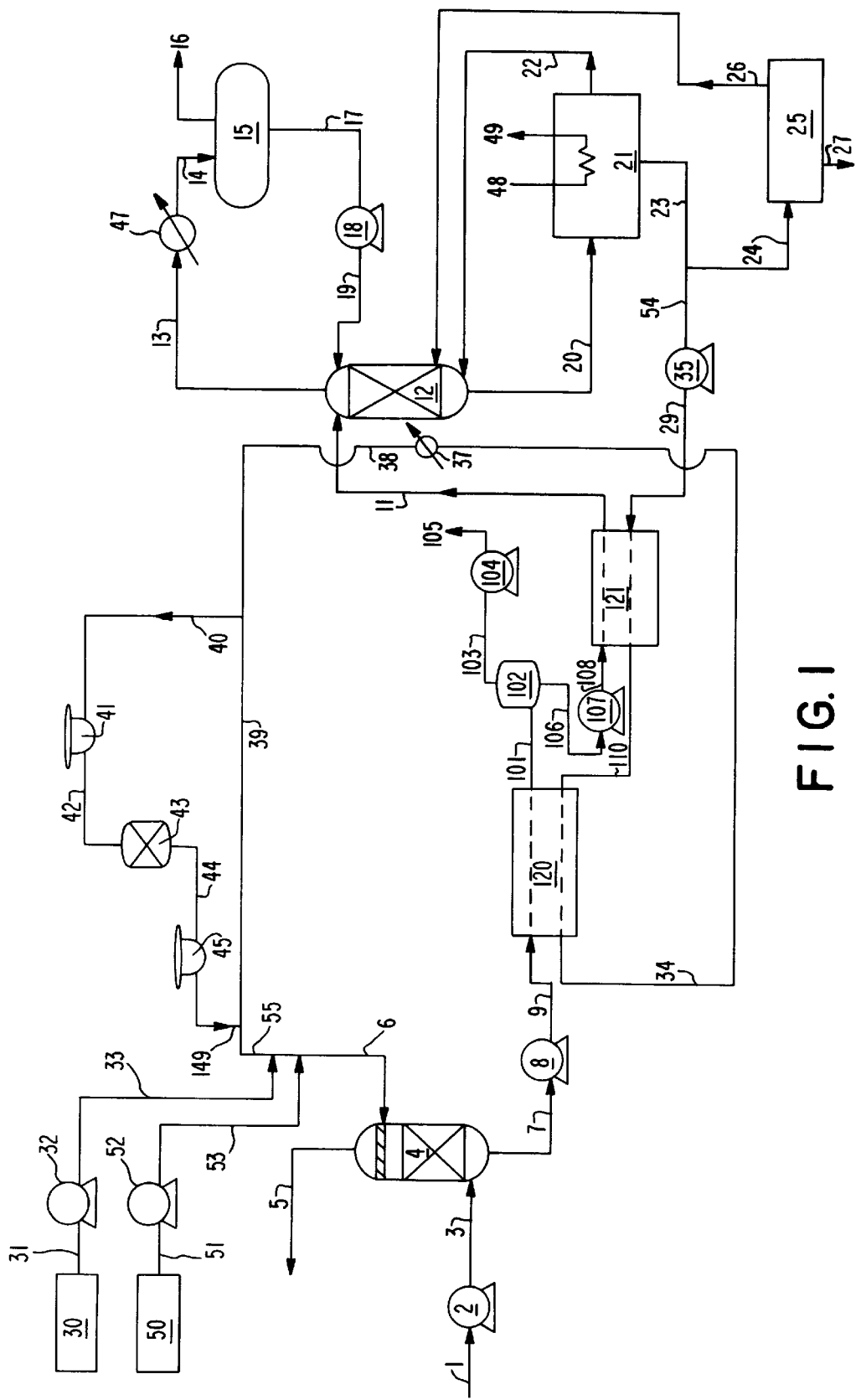
FIG. 1 is a schematic representation of one particularly preferred embodiment of the invention wherein the oxygen separator comprises a flash tank and a vacuum pump.

The invention will be described in greater detail with reference to the Drawings. Referring now to FIG. 1, lean feed gas 1, which typically has been cooled and treated for the reduction of particulates and other impurities such as sulfur oxides (SOx) and nitrogen oxides (NOx), is passed to compressor or blower 2 wherein it is compressed to a pressure generally within the range of from 14.7 to 30 pounds per square inch absolute (psia). Lean feed gas 1 contains less than 50 mole percent carbon dioxide as the absorbate, and typically has a carbon dioxide concentration within the range of from 3 to 25 mole percent. Lean feed gas 1 also contains oxygen in a concentration generally within the range of from less than 1 mole percent to about 18 mole percent. Lean feed gas 1 may also contain one or more other components such as trace hydrocarbons, nitrogen, carbon monoxide, water vapor, sulfur oxides, nitrogen oxides and particulates.

Compressed lean feed gas 3 is passed from blower 2 into the lower portion of absorption column 4 which is operating at a temperature generally within the range of from 40 to 45° C. at the top of the column and at a temperature generally within the range of from 50 to 60° C. at the bottom of the column. Typically absorbent 6 is passed into the upper portion of absorption column 4. Absorbent 6 is a fluid comprising at least one alkanolamine species which may be primary and/or secondary alkanolamines. Examples of alkanolamines which may be employed in absorbent 6 in the practice of this invention are monoethanolamine, diethanolamine, diisopropanolamine, methyldiethanolamine and triethanolamine. Generally the alkanolamines are employed as an aqueous solution. The concentration of the alkanolamine(s) in absorbent 6 will be within the range of from 5 to 80 weight percent, and preferably from 10 to 50 weight percent. A preferred primary alkanolamine for use in the absorbent fluid in the practice of this invention is monoethanolamine, preferably in a concentration within the range of from 5 to 25 weight percent, more preferably in a concentration within the range of from 10 to 15 weight percent. Preferred secondary alkanolamines for use in the absorbent fluid in the practice of this invention are diethanolamine and diisopropanolamine.

Within absorption column 4 the lean feed gas rises in countercurrent flow against downflowing absorbent. Absorption column 4 contains column internals or mass transfer elements such as trays or random or structured packing. As the feed gas rises, most of the carbon dioxide within the feed gas, oxygen, and small amounts of other species such as nitrogen, are absorbed into the downflowing absorbent resulting in carbon dioxide depleted top vapor at the top of column 4, and into carbon dioxide loaded absorbent containing dissolved oxygen at the bottom of column 4. The top vapor is withdrawn from the upper portion of column 4 in stream 5 and the carbon dioxide loaded absorbent is withdrawn from the lower portion of column 4 in stream 7.

Stream 7 is passed to liquid pump 8 and from there in stream 9 to and through first heat exchanger 120 wherein it is heated by indirect heat exchange to a temperature generally within the range of from 60 to 90° C., preferably within the range of from 75 to 80° C. The resulting heated carbon dioxide loaded absorbent undergoes deoxygenation. In the embodiment of the invention illustrated in FIG. 1 the deoxygenation is carried out by depressurization. Heated carbon dioxide loaded absorbent 101 is passed from first heat exchanger 120 in stream 101 to flash tank 102 where its pressure is reduced from above atmospheric pressure to subatmospheric pressure, generally within the range of from 3 to 12 psia and preferably within the range of from 5 to 10 psia, by operation of vacuum pump 104. As a consequence of this depressurization, dissolved oxygen is released from the absorbent. Generally the depressurization will cause at least 50 percent of the oxygen dissolved in absorbent 101 to be released. The released oxygen is passed out of flash tank 102 in stream 103, through vacuum pump 104, and removed from the system in stream 105. Depressurization will cause some carbon dioxide to be released along with oxygen and other species. The stream can be vented to the atmosphere, used as is, or mixed with the final product carbon dioxide.

The resulting oxygen depleted carbon dioxide loaded absorbent typically containing less than 2 ppm oxygen and preferably less than 0.5 ppm oxygen, is withdrawn from flash tank 102 in stream 106, passed to liquid pump 107 and from there in stream 108 to and through second heat exchanger 121 wherein it is further heated by indirect heat exchange to a temperature generally within the range of from 100 to 110° C. Since the further heating takes place after most or all of the oxygen has been removed from the absorbent, the absorbent need not contain any inhibitors to inhibit oxidative degradation of the alkanolamines. The further heated oxygen depleted absorbate loaded absorbent is passed to an absorbate recovery system for the recovery of absorbate. In the embodiment of the invention illustrated in FIG. 1, the further heated oxygen depleted carbon dioxide loaded absorbent is passed from second heated exchanger 121 in stream 11 into the upper portion of stripping column 12 which is operating at a temperature typically within the range of from 100 to 110° C. at the top of the column and at a temperature typically within the range of from 119 to 125° C. at the bottom of the column. As the absorbent flows down through stripping column 12 over mass transfer elements which can be trays or random or structured packing, carbon dioxide within the absorbent is stripped from the alkanolamine solution into upflowing vapor, which is generally steam, to produce carbon dioxide top vapor and remaining alkanolamine absorbent. The carbon dioxide top vapor is withdrawn from the upper portion of stripping column 12 in stream 13 and passed through reflux condenser 47 wherein it is partially condensed. Resulting two phase stream 14 is passed to reflux drum or phase separator 15 wherein it is separated into carbon dioxide gas and into condensate. The carbon dioxide gas is removed from phase separator 15 in stream 16 and recovered as carbon dioxide product fluid having a carbon dioxide concentration generally within the range of from 95 to 99.9 mole percent on a dry basis. By "recovered" as used herein it is meant recovered as ultimate product or separated for any reason such as disposal, further use, further processing or sequestration. The condensate, which comprises primarily water and alkanolamine, is withdrawn from phase separator 15 in stream 17, passed through liquid pump 18 and as stream 19 into the upper portion of stripping column 12.

Remaining alkanolamine absorbent which also contains water is withdrawn from the lower portion of stripping column 12 in stream 20 and passed to reboiler 21 wherein it is heated by indirect heat exchange to a temperature typically within the range of from 119 to 125° C. In the embodiment of the invention illustrated in FIG. 1, reboiler 21 is driven by saturated steam 48 at a pressure of 28 pounds per square inch gauge (psig) or higher, which is withdrawn from reboiler 21 in stream 49. The heating of the alkanolamine absorbent in reboiler 21 drives off some water which is passed as steam in stream 22 from reboiler 21 into the lower portion of stripping column 12 wherein it serves as the aforesaid upflowing vapor. The resulting alkanolamine absorbent is withdrawn from reboiler 21 in liquid stream 23. A portion 24 of stream 23 is fed to reclaimer 25 where this liquid is vaporized. Addition of soda ash or caustic soda to the reclaimer facilitates precipitation of any degradation byproducts and heat stable amine salts. Stream 27 depicts the disposal of the degradation byproducts and heat stable amine salts. The vaporized amine solution 26 can be reintroduced into the stripper as shown in FIG. 1. It can also be cooled and directly mixed with stream 6 entering the top of the absorber 4. Also, instead of the reclaimer 25 shown in FIG. 1, other purification methods such as ion-exchange or electrodialysis could be employed.

The remaining portion 54 of heated alkanolamine absorbent 23 is passed to solvent pump 35 and from there in stream 29 to and through second heat exchanger 121 wherein it serves to carry out the aforesaid further heating of the oxygen depleted carbon dioxide loaded absorbent. Resulting alkanolamine absorbent 110 is passed from second heat exchanger 121 to and through first heat exchanger 120 wherein it serves to carry out the aforesaid heating of the carbon dioxide loaded absorbent containing dissolved oxygen, and from which it emerges as cooled alkanolamine absorber fluid 34.

Stream 34 is cooled by passage through cooler 37 to a temperature of about 40° C. to form absorbent 38. A portion 40 of stream 38 is passed through mechanical filter 41, from there as stream 42 through carbon bed filter 43, and from there as stream 44 through mechanical filter 45 for the removal of impurities, solids, degradation byproducts and heat stable amine salts. Resulting purified stream 149 is recombined with stream 39 which is the remainder of stream 38 to form stream 55. Storage tank 30 contains additional alkanolamine for makeup. Alkanolamine absorbent is withdrawn from storage tank 30 in stream 31 and pumped by liquid pump 32 as stream 33 into stream 55. Storage tank 50 contains makeup water. Water is withdrawn from storage tank 50 in stream 51 and pumped by liquid pump 52 as stream 53 into stream 55. Streams 33 and 53 together with stream 55 form combined absorbent stream 6 for passage into the upper portion of absorber column 4 as was previously described.

Figure 2:
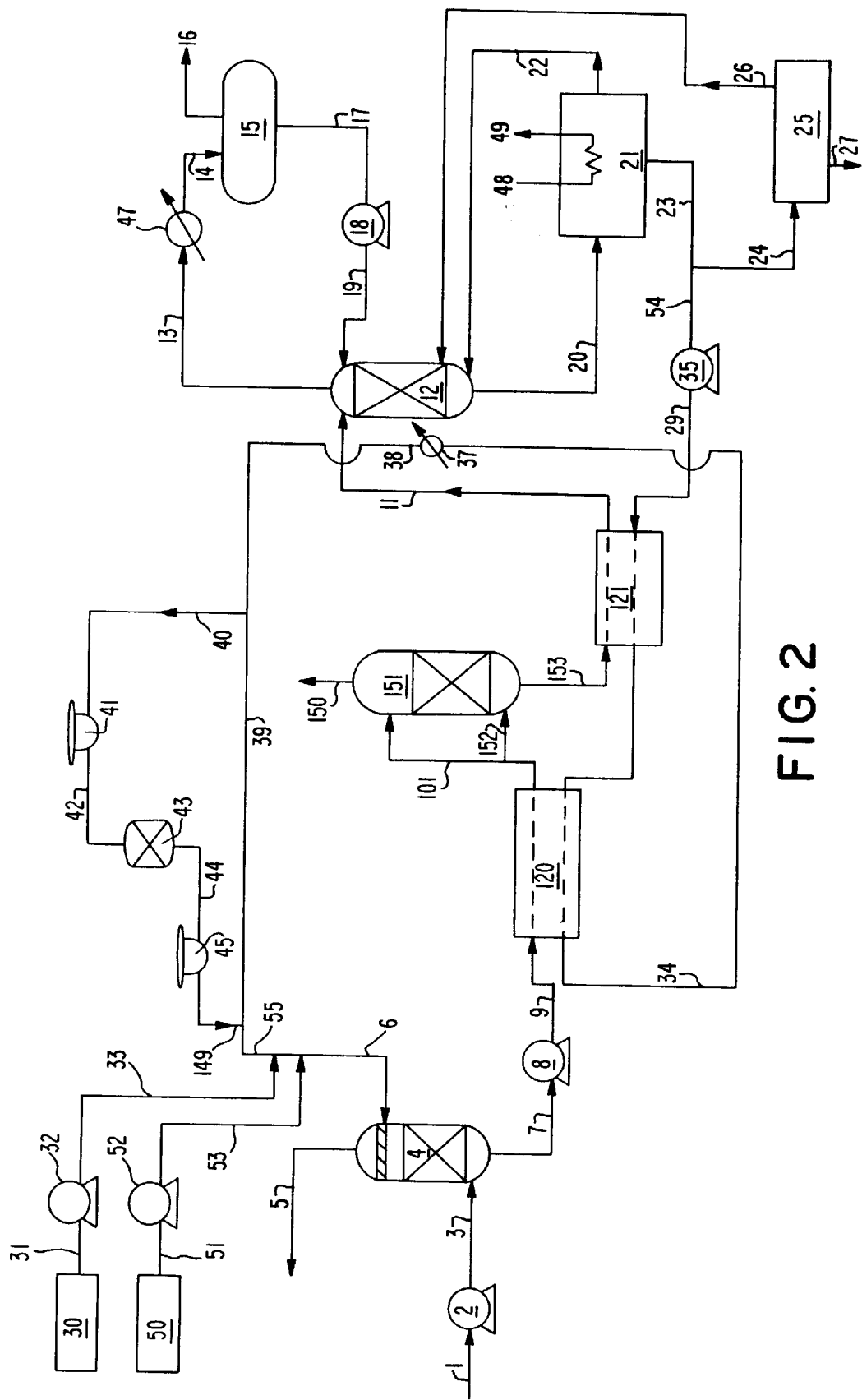
FIG. 2 is a schematic representation of another particularly preferred embodiment of the invention wherein the oxygen separator comprises a stripping column.

FIG. 2 illustrates another embodiment of the invention wherein a stripping column is used to carry out the deoxygenation of the carbon dioxide loaded absorbent. The numerals of FIG. 2 are the same as those of FIG. 1 for the common elements and these common elements will not be discussed again in detail.

Referring now to FIG. 2, heated carbon dioxide loaded absorbent 101 is passed from heat exchanger 120 into the upper portion of oxygen stripping device 151, and oxygen scavenging gas 152 is passed into the lower portion of column 151. One preferred source of oxygen scavenging gas 152 is a small split stream, about two percent, of product stream 16. The heated carbon dioxide loaded absorber fluid flows downwardly through oxygen stripping column 151 over mass transfer internals such as trays or random or structured packing countercurrently to upflowing oxygen scavenging gas, and in the process dissolved oxygen is stripped from the downflowing carbon dioxide loaded absorbent into the upflowing oxygen scavenging gas. The resulting oxygen-containing scavenging gas is withdrawn from the upper portion of column 151 in stream 150, and the resulting oxygen depleted carbon dioxide loaded absorbent, typically containing less than 2 ppm oxygen and preferably less than 0.5 ppm oxygen, is withdrawn from the lower portion of column 151 and passed to second heat exchanger 121 for further processing as previously described in conjunction with the embodiment illustrated in FIG. 1.

Although the invention has been described in detail with reference to certain particularly preferred embodiments, those skilled in the art will recognize that there are other embodiments of the invention within the spirit and the scope of the claims. Moreover, the oxygen tolerant alkanolamine-based recovery system of this invention may be used for separation of other compounds other than or in addition to carbon dioxide, such as hydrogen sulfide or a mixture of carbon dioxide and hydrogen sulfide. A rigorous definition of such generalized oxygen tolerant alkanolamine-based recovery process is:

A method for recovering absorbate from an oxygen-containing feed comprising:

(A) providing a feed comprising oxygen and absorbate in mass transfer contact with absorbent comprising at least one alkanolamine, and passing oxygen and absorbate from the feed into the absorbent to obtain absorbate loaded absorbent containing dissolved oxygen;

(B) heating the absorbate loaded absorbent to obtain heated absorbate loaded absorbent;

(C) removing at least some of the dissolved oxygen from the absorbate loaded absorbent to obtain oxygen depleted absorbate loaded absorbent; and (D) further heating the oxygen depleted absorbate loaded absorbent and thereafter recovering absorbate from the absorbent.

What is claimed is:

1. A method for recovering carbon dioxide from a lean feed comprising:

(A) providing a lean feed comprising oxygen and carbon dioxide in mass transfer contact with absorbent comprising at least one alkanolamine, and passing oxygen and carbon dioxide from the lean feed into the absorbent to obtain carbon dioxide loaded absorbent containing dissolved oxygen;

(B) heating the carbon dioxide loaded absorbent to obtain heated carbon dioxide loaded absorbent;

(C) removing at least some of the dissolved oxygen from the carbon dioxide loaded absorbent to obtain oxygen depleted carbon dioxide loaded absorbent; and (D) further heating the oxygen depleted carbon dioxide loaded absorbent and thereafter recovering carbon dioxide from the absorbent.

2. The method of claim 1 wherein dissolved oxygen is removed from the carbon dioxide loaded absorbent by reducing the pressure of the carbon dioxide loaded absorbent and flashing off dissolved oxygen.

3. The method of claim 1 wherein dissolved oxygen is removed from the carbon dioxide loaded absorbent by stripping oxygen from the carbon dioxide loaded absorbent into oxygen scavenging gas.

4. Apparatus for recovering absorbate from an oxygen-containing feed comprising.

(A) an absorption column, means for passing a feed comprising oxygen and absorbate into the lower portion of the absorption column, and means for passing absorbent comprising at least one alkanolamine into the upper portion of the absorption column;

(B) a first heat exchanger, an oxygen separator, means for passing fluid from the lower portion of the absorption column to the first heat exchanger, and means for passing fluid from the first heat exchanger to the oxygen separator;

(C) a second heat exchanger and means for passing fluid from the oxygen separator to the second heat exchanger; and (D) an absorbate recovery system, means for passing fluid from the second heat exchanger to the absorbate recovery system, and means for recovering absorbate from the absorbate recovery system.

5. The apparatus of claim 4 wherein the oxygen separator comprises a flash tank and a vacuum pump.

6. The apparatus of claim 4 wherein the oxygen separator comprises a stripping device.

7. A method for recovering absorbate from an oxygen-containing feed comprising:

(A) providing a feed comprising oxygen and absorbate in mass transfer contact with absorbent comprising at least one alkanolamine, and passing oxygen and absorbate from the feed into the absorbent to obtain absorbate loaded absorbent containing dissolved oxygen;

(B) heating the absorbate loaded absorbent to obtain heated absorbate loaded absorbent;

(C) removing at least some of the dissolved oxygen from the absorbate loaded absorbent to obtain oxygen depleted absorbate loaded absorbent; and (D) further heating the oxygen depleted absorbate loaded absorbent and thereafter recovering absorbate from the absorbent.

8. The method of claim 7 wherein dissolved oxygen is removed from the absorbate loaded absorbent by reducing the pressure of the absorbate loaded absorbent and flashing off dissolved oxygen.

9. The method of claim 7 wherein dissolved oxygen is removed from the absorbate loaded absorbent by stripping oxygen from the absorbate loaded absorbent into oxygen scavenging gas.

10. The method of claim 7 wherein the absorbate comprises hydrogen sulfide.

* * * * *